(No Model.)
D. T. HOLT.
COMBINED MEASURE AND FUNNEL.
No. 485,545.  Patented Nov. 1, 1892.
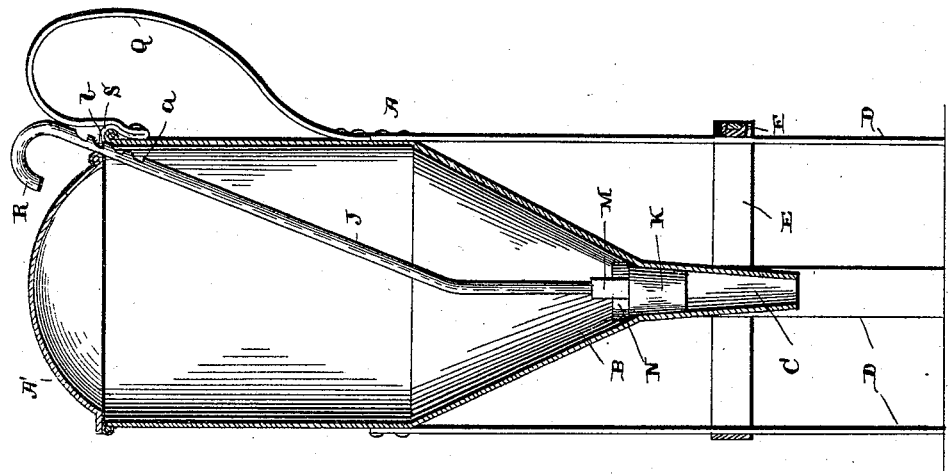
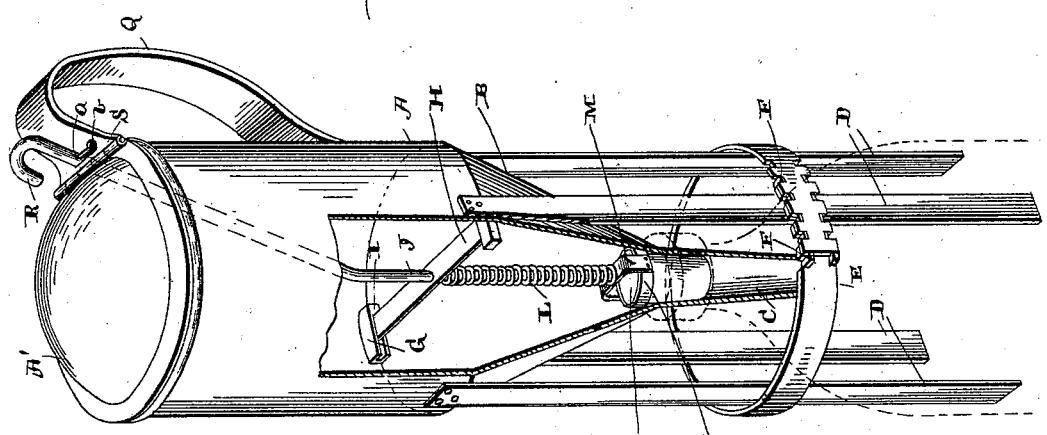
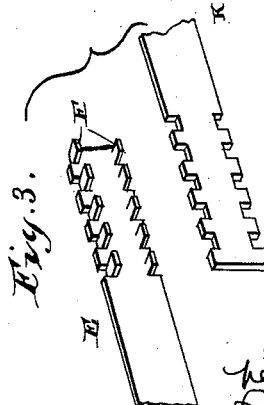
WITNESSES.
Geo. E. Frech
Rol. A. Fitzgerald
INVENTOR.
Dudley T. Holt
per Lehmann Pattison & Nesbit
Attys

UNITED STATES PATENT OFFICE.

DUDLEY T. HOLT, OF HARROLD, TEXAS.

COMBINED MEASURE AND FUNNEL.

SPECIFICATION forming part of Letters Patent No. 485,545, dated November 1, 1892.

Application filed May 25, 1892. Serial No. 434,313. (No model.)

*To all whom it may concern:*

Be it known that I, DUDLEY T. HOLT, of Harrold, in the county of Wilbarger and State of Texas, have invented certain new and useful Improvements in a Combined Measure and Funnel; and I do hereby declare the following to be a full, clear, and exact description of the invention, such as will enable others skilled in the art to which it pertains to make and use it, reference being had to the accompanying drawings, which form part of this specification.

My invention relates to improvements in combined measures and funnels to be used in filling jugs and other small-mouthed vessels; and it consists in the construction and arrangement of parts which will be fully described hereinafter, and particularly referred to in the claim.

The object of my invention is to provide a combined measure and funnel which can be applied to jugs and other small-mouthed vessels, the same being constructed to support itself and to be adjusted to receptacles of different sizes and also to construct the device with a means for stopping the flow of liquid from the measure whenever so desired and to allow it to flow at will.

Figure 1 is a perspective view of my invention, showing it complete, the upper end of a jug shown in dotted lines and the measure in section to show the interior thereof. Fig. 2 is a perspective view of a modification. Fig. 3 is a detached perspective view of the band.

A indicates a measure, of any desired size, which is provided at its lower end with a funnel B, that is rigidly connected thereto and forms a part thereof. Extending from the measure A, a suitable distance below the nozzle C of the funnel B, are several legs or arms D, which rest against the outer side of the jug or other vessel and support the measure in an upright position upon the jug. Passing around the legs at any desirable point is a band E, which is provided with projections F, which interlock, so that the band can be expanded or contracted, thus allowing the legs to be spread for large jugs and to be contracted to fit small jugs, as will be readily understood.

Inside of the measure A are the two inwardly-extending shoulders or lips G, under which a bar or plate H has its ends turned, as shown, whereby the said plate is held in place. These shoulders are formed into grooves to receive the ends of the plate, and at one end of each groove is a stop I, which prevents the ends of the plate from being turned too far when being placed in position. Passing through the center of this plate is a rod J, which has connected to its lower end a stopper K, preferably of rubber. By turning the said plate it and the rod can be removed from the measure for the purpose of allowing it to be conveniently cleaned. Around the lower end of this rod is a spiral spring L, which has its lower end resting upon the top of a U-shaped cross-bar M, (to which the said stopper is connected by passing through a ring N, that is secured to the lower ends of the U-shaped cross-bar,) and a spring P, which has its upper end resting against the under side of the plate H. By means of this spring the stopper is kept normally in position in the upper end of the nozzle of the funnel and prevents the outflow of any of the contents of the measure. This rod J extends up slightly above the top of the measure and is bent over toward the handle Q thereof, as shown. The upper end of the rod is provided with a hook or eye R, in which the finger can be placed, and the rod raised against the tension of the spring for the purpose of opening the upper end of the funnel-nozzle.

Extending inward from the upper end of the measure is a plate or lip S, just inside of the handle of the measure, and the rod J is notched on its outer side, as shown at *a*, which notches engage the inner edge of the said plate and form therewith a catch to hold the rod raised against the tension of the spring. This plate S is provided with a notch *b*, so that when it is desired to allow the rod to drop under the pressure of the spring and close the funnel-nozzle it is only necessary to move the rod to one side until it falls in the said notch, when the spring will depress the rod and close the nozzle-opening. So, also, when it is desired to operate the rod without any interference therewith by the plate engaging the notches the rod is held in this notch, when it can be freely moved up and down for opening and closing the nozzle by means of the finger of the operator.

By means of a combined measure and funnel as, just described, I am enabled to fill a jug with any desired quantity of liquid (limited, of course, by the capacity of the measure) and to stop the flow when desired. When filling jugs of a large size, the device is supported by means of the legs and the operator then catches the rod in an upright position, when the jug can be filled by pouring into the measure, as through an ordinary funnel. So, also, the legs can be drawn in against the sides of a small jug or receptacle by means of the contractible band which passes around them. Hinged to the plate or lip S is a cover A', but which does not interfere with the operation of the rod, since it passes through the lip in rear of the cover.

If desired, the transverse plate and spring may be omitted and the rod used, as shown in Fig. 2. In this instance the stopper is held to its plate by engagement with the lip S, as will be understood, and when the notches of the rod are pushed out of engagement with the lip the rod can be raised by the finger to allow the outflow of the contents and then the stopper replaced again by forcing the rod down, as will be readily seen.

Having thus described my invention, what I claim, and desire to secure by Letters Patent, is—

A measure provided with a funnel at its lower end, grooves at opposite inner sides of the said measure, a plate which is detachably held in said grooves, and a rod which passes through the said plate and carries a stopper at its lower end, the rod extending to the top of the measure to be operated, whereby the rod can be detached from the measure by removing the said plate from the grooves and the measure cleaned, substantially as specified.

In testimony whereof I affix my signature in presence of two witnesses.

DUDLEY T. HOLT.

Witnesses:
R. A. MORGAN,
T. M. HOLT.